United States Patent
Meyer

(10) Patent No.: US 11,969,972 B2
(45) Date of Patent: Apr. 30, 2024

(54) MULTILAYER FILM, IN PARTICULAR SEALING FILM

(71) Applicant: SPC SUNFLOWER PLASTIC COMPOUND GMBH, Garrel (DE)

(72) Inventor: Sebastian Meyer, Herner (DE)

(73) Assignee: SPC Sunflower Plastic Compound GmbH, Garrel (DE)

( * ) Notice: Subject to any disclaimer, the term of this patent is extended or adjusted under 35 U.S.C. 154(b) by 672 days.

(21) Appl. No.: 17/255,450

(22) PCT Filed: Jun. 25, 2019

(86) PCT No.: PCT/EP2019/066785
§ 371 (c)(1),
(2) Date: Dec. 23, 2020

(87) PCT Pub. No.: WO2020/002304
PCT Pub. Date: Jan. 2, 2020

(65) Prior Publication Data
US 2021/0300002 A1    Sep. 30, 2021

(30) Foreign Application Priority Data

Jun. 25, 2018   (DE) ................. 10 2018 115 236.1

(51) Int. Cl.
*B32B 23/06*    (2006.01)
*B32B 7/02*    (2019.01)
(Continued)

(52) U.S. Cl.
CPC ............... *B32B 23/06* (2013.01); *B32B 7/02* (2013.01); *B32B 23/10* (2013.01); *B32B 23/20* (2013.01); *B32B 2255/26* (2013.01); *B32B 2307/7163* (2013.01); *B32B 2307/724* (2013.01); *B32B 2435/02* (2013.01); *B32B 2439/70* (2013.01)

(58) Field of Classification Search
None
See application file for complete search history.

(56) References Cited

U.S. PATENT DOCUMENTS 2,570,478 A    10/1951   Pitzl
3,794,515 A *  2/1974   Turbak ................. C09D 127/08
                                                    428/34.8
(Continued)

FOREIGN PATENT DOCUMENTS

CN    106573712 A     4/2017
DE    102013208876    11/2014
(Continued)

OTHER PUBLICATIONS

Search Report for CN 201980042836.9 dated Dec. 2, 2021.
(Continued)

*Primary Examiner* — Chinessa T. Golden
(74) *Attorney, Agent, or Firm* — Eugene LeDonne; Haug Partners LLP

(57) ABSTRACT

The invention relates to a multilayer film, especially sealing film, suitable as food packaging, especially as packaging for food containers, drinks capsules, coffee capsules or the like, wherein the film consists of at least one first layer and at least one second layer, wherein at least one of the layers of the film is a biodegradable and home-compostable plastic.

4 Claims, 1 Drawing Sheet

(51) Int. Cl.
  *B32B 23/10* (2006.01)
  *B32B 23/20* (2006.01)

(56) References Cited

U.S. PATENT DOCUMENTS

| | | |
|---|---|---|
| 2013/0236609 A1 | 9/2013 | Magniet et al. |
| 2014/0370161 A1 | 12/2014 | Abegglen et al. |
| 2015/0307268 A1 | 10/2015 | Zanetti |

FOREIGN PATENT DOCUMENTS

| | | | |
|---|---|---|---|
| DE | 102013216309 | 2/2015 | |
| EP | 3398766 | 11/2018 | |
| EP | 3461637 A1 | 4/2019 | |
| GB | 1236133 | 6/1971 | |
| JP | 2017100718 A | 6/2017 | |
| JP | 2018089979 A | 6/2018 | |
| WO | WO 2013/072146 | 5/2013 | |
| WO | WO/2015/121489 | 8/2015 | |
| WO | WO 2015/177591 | 11/2015 | |
| WO | WO 2015177591 A2 | 11/2015 | |
| WO | WO 2017/063680 | 4/2017 | |
| WO | WO 2017063680 A1 | 4/2017 | |
| WO | WO-2017063680 A1 * | 4/2017 | ......... B65D 85/8046 |
| WO | WO/2017/072808 | 5/2017 | |
| WO | WO 2017/186743 | 11/2017 | |
| WO | WO2017/187024 | 11/2017 | |
| WO | WO 2017186743 A1 | 11/2017 | |

OTHER PUBLICATIONS

Examination Report for CN 201980042836.9 dated Dec. 13, 2021.
International Search Report for PCT/EP2019/066785 dated Sep. 2, 2019.
German Search Report for DE 10 2018 115 236.1 dated Mar. 3, 2020.
Office Action dated Apr. 25, 2023 for corresponding Japanese Application No. 2020-572404 and its English translation.

* cited by examiner

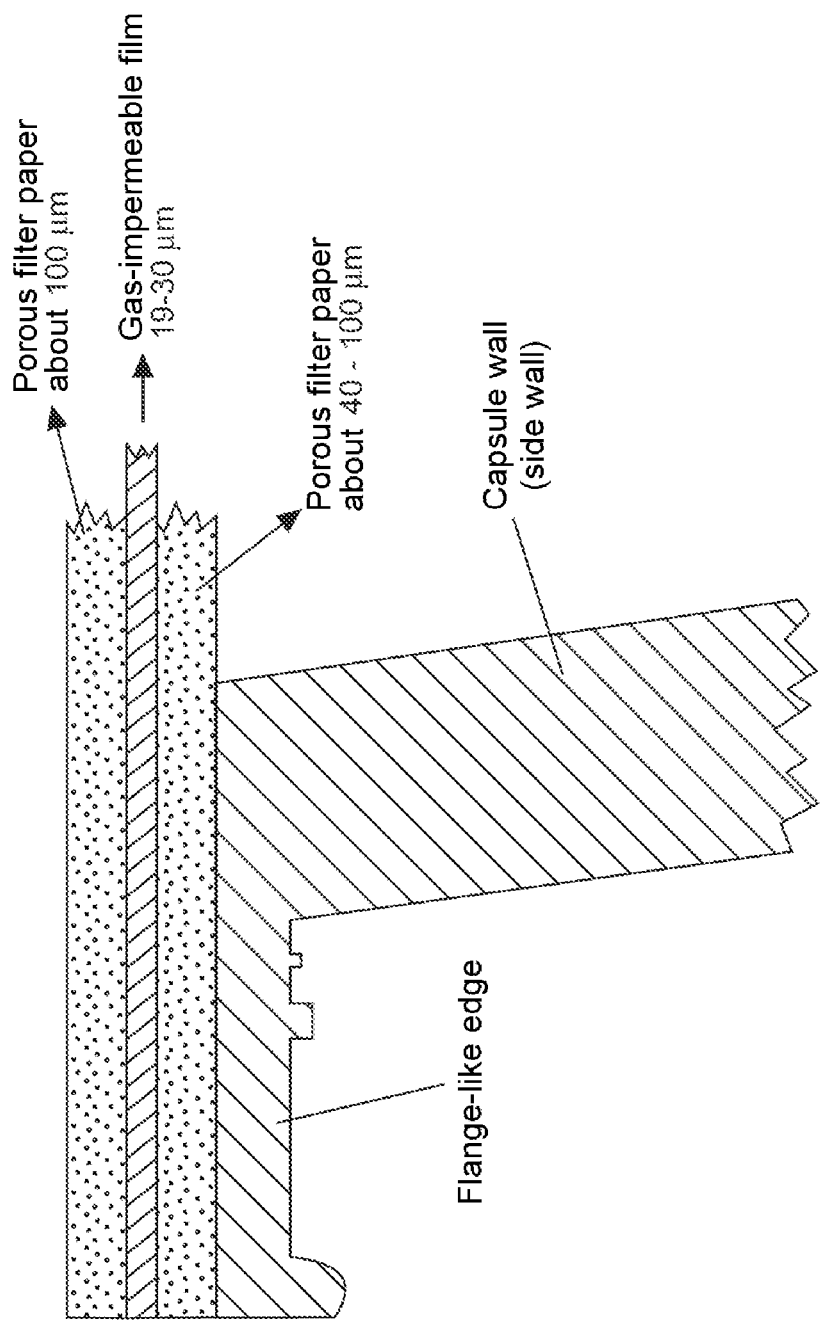

MULTILAYER FILM, IN PARTICULAR SEALING FILM

CROSS-REFERENCE TO RELATED APPLICATIONS

This application is the National Stage entry under 35 U.S.C. § 371 of International Application No. PCT/EP2019/066785 filed Jun. 25, 2019, published as Publication No. WO 2020/002304 on Jan. 2, 2020, which claims benefit of foreign priority of German Patent Application No. 10 2018 115 236.1, filed on Jun. 25, 2018, the entireties of which are herein incorporated by reference.

FIELD OF DISCLOSURE

The present invention concerns multilayer film, in particular sealing film.

BACKGROUND

There are many kinds of polymer films, and these films are frequently used for packaging or have a very specific function. One particular function in this context is that of a sealing film which is used in food packaging, for example as a cover for drinks capsules, for example for coffee, tea and all kinds of functional beverages, in which, on the one hand, film seals the filled interior of the capsule, i.e. coffee, tea, herbs etc., in an airtight manner, but, on the other hand, it is also possible that the capsule can be penetrated by the respective machine by means of needles in order then to inject liquid, for example hot water, into the capsule through the hollow needles under a predetermined pressure. Finally, it is also possible that the breakage of the film is caused not by outside mechanical action but by the water pressure, which forces the film against a frustopyramidal surface and deforms it in such a way that the ultimate elongation is exceeded, resulting in breakage of the film.

In the case of such uses, the capsule material has a capsule wall, a capsule base and, on the opposite side from the capsule base, an opening having a flange-like edge running around the circumference in a regular manner.

The sealing film is then applied to said capsule opening once the capsule has been filled with the desired beverage powder, i.e., for example, coffee, tea or the like.

If, in a coffee machine, appropriate filling stubs penetrate through the capsule base in order thus to inject water into the capsule at a predetermined temperature and with a predetermined pressure, cutting elements or needles etc. penetrate or cut through etc. the sealing film, such that the liquid, i.e., for example, coffee, tea, functional drink, etc. can escape from the capsule.

There is already a multitude of known suggestions for design of the sealing film.

However, a particular challenge exists when the sealing film is not just to fulfill its function as sealing film, but when the entire capsule including the sealing film is also to be home-compostable, i.e. biodegradable within a relatively short period of time.

If, for example, the sealing film consists of conventional standard plastic, for example polypropylene (PP), polyethylene (PE), polyvinylchloride (PVC), etc., the condition of such home compostability of the film and hence of the entire capsule as well is not satisfied.

When the capsule body consists of a home-compostable plastic, for example $S^2$PC-PBS, and the sealing film of a conventional plastic, it would be possible to separate the sealing film from the capsule body prior to composting, but this is extremely complex, barely implementable by technical means, and ultimately also uneconomic for reasons of cost.

Where the present application refers to a home-compostable plastic of the $S^2$PC-PBS or $S^2$PC-PBSA or $S^2$PC-PBS/PBSA type, this means the material which is also described and disclosed in patent application WO 2017/186743. The contents of that application are also incorporated into the subject-matter of the present application. $S^2$PC-PBS/$S^2$PC-PBSA or $S^2$PC-PBS/PBSA are a biocomposite in which the biological constituent ($S^2$PC) husk material is a ground husk material from the husk of the sunflower seed, and PBS is a polybutylene succinate (a chemical compound from the group of the linear aliphatic polyesters) and PBSA is a polyethylene succinate adipate. PBS and PBSA as such are known as biodegradable materials.

Further prior art to which reference is made is DE 102013216309, DE 102013208876 and WO 2013/072146.

Also known is the manufacture of capsules, and also the covering film, not from plastic but from metal, for example aluminum. The formation of thin aluminum foils is also known, but use of such a material in the capsule, especially also in the film, does not meet the demands of home compostability.

Finally, it is also known that various kinds of papers are used as sealing film where they are advertised as "bio" or "compostable". The disadvantage of these papers is that they do not have good barrier action against oxygen, and hence the coffee within the capsule quickly loses quality, and is ultimately thus degraded by oxidation, which is reflected in a very unpleasant manner in the taste.

SUMMARY OF INVENTION

The main aim of the present invention is thus to provide a sealing film, especially a sealing film for drinks capsules, which has very good oxygen barrier action, which is home-compostable and also has desired fracture characteristics in order that the known means in the coffee machine are able to efficiently open the sealing film.

BRIEF DESCRIPTION OF THE DRAWINGS

Advantages and embodiments by way of example of the invention are described in greater detail hereinafter with reference to the drawings.

FIG. 1 shows an exemplary film according to an embodiment of the invention.

DETAILED DESCRIPTION

The object of the invention is achieved, for example, by means of a film that has been developed on the basis of $S^2$PC-PBS. The thickness of the film here may be between 50 μm and 1500 μm, with particular preference for use of the 300 μm version.

The object of the invention is also achieved by a film in a multilayer composite, in which an interlayer of about 15 to 50 μm, preferably about 30 μm, of PVOH or "G polymer" is used. This allows the film to achieve an oxygen barrier effect of up to 0.4 $cm^3$, $m^2 \times d \times bar$.

The multilayer method may also be applied to the capsule wall material. For this purpose, the coffee capsule is provided in a convection method in which the barrier layer consists of PVOH or G polymer. In this way, it is likewise possible to achieve high oxygen barrier values. These constitute a preferred execution variant of the invention.

A further variant for achievement of the object consists of a multilayer film, said film consisting of one or two plies of filter paper (in principle, these are papers that are also used for tea filters) and one ply (layer) of polymer film. The layer of filter paper and the polymer film, for example of $S^2PC$-PBS, PBS, PBS/PBSA, PLA, PHA or the like, are bonded, e.g. laminated, to one another by a lamination process.

Also particularly useful in accordance with the invention as polymer film is a mixture of PBS/PBSA.

The advantage of the paper ply is that it is naturally porous; the advantage of the polymer film is that it is gas-impermeable. This is also the case to a sufficient degree when the polymer film consists of a home-compostable plastic, e.g. $S^2PC$-PBS, PBS PLA or the like.

The filter paper ply may alternatively also be formed by a ply/layer, e.g. web layer, composed of polymer fibers of compostable raw materials, especially home-compostable raw materials, for example $S^2PC$-PBS, PBS, PBSA, mixture of PBS/PBSA, PLA, PHA, or mixtures thereof.

The aforementioned film plies of the multilayer composite may all be configured such that the film has a total thickness of preferably below 0.2 mm.

An example of this film shown in the drawing is shown in FIG. 1.

It is clearly apparent therein that the sealing film consists of a first, second and third (optional) layer, namely a first layer of porous filter paper having a thickness of about 40-100 µm.

This is followed by a gas-impermeable film having a thickness in the range between 10 µm and 30 µm, preferably in the range of 13-25 µm, more preferably 14-19 µm.

This is in turn followed by a porous filter paper having a thickness of about 30 to 100 µm.

This film composed of the three layers described is bonded, laminated, welded etc. onto the flange-like edge of the capsule wall. The capsule wall here forms the side wall of the capsule.

Rather than the three-layer design of the film shown, a two-layer design is also possible, in which case either the outer ply of porous filter paper or the inner ply of porous filter paper is omitted. A gas-impermeable film is always required in order to provide sufficient oxygen barrier action.

A particularly thin or particularly porous filter paper promotes sealing without additional polymer fibers in the paper.

A particularly thin paper is one having a basis weight of below 12 g/m² and a thickness of about 40 µm. Particularly porous papers are understood to mean those having an air permeability of more than 1500 l/m²*s.

Another aim of the invention is thus to use the sealing film and the corresponding drinks capsule material not just to provide a home-compostable solution, but also to provide a solution in which a sufficient oxygen barrier is provided solely by virtue of the capsule and its coverage by the film itself.

In a known solution in which, for example, the sealing film consists solely of paper, development of an adequate oxygen barrier requires the entire filled drinks capsule to be accommodated in an additional barrier package, said barrier package typically consisting of or comprising PE, aluminum or PE-EVOH-PE or the like. Before the use of the drinks capsule, the capsule is then removed from the barrier package, which in turn produces additional waste in the form of the barrier package, and this barrier package is not home-compostable but has to go through the customary plastic or waste disposal route.

In order to avoid too much waste of this kind, a multitude of capsules, for example 10 of them, are therefore frequently packed in a common outer package. If, however, this package is opened in order to remove the first capsule, the shelf life of the other products already begins to fall, because the air that penetrates into the outer package also degrades and ages the interior of the drinks capsule contents.

If a simple paper film were to be provided as sealing film, the contents of the capsule, i.e. coffee for example, would at some point be spoiled or degraded in taste to such an extent that it is no longer an attractive product.

It would also be possible to use solely a polymer film as lid for the drinks capsule. As mentioned, however, these are generally too flexible to break at the required moment. Even brittle films that break at the correct moment, as a result of the hot water under pressure and the associated softening of the film material, subsequently block the holes of the extraction sieve of the extraction machine.

It is also possible to use a regenerated cellulose rather than cellulose acetate, or a mixture of a cellulose acetate and a regenerated cellulose. Regenerated celluloses used may be any of the known regenerated cellulose materials; preference is given to viscose (rayon staple) and or cellulose hydrate (cellophane).

In the example shown in the FIGURE, the gas-impermeable film preferably consists of or comprises a cellulose acetate. Such a cellulose acetate film having a thickness of 10 to 50 µm assures an excellent oxygen barrier of up to 1 $cm^3/m^2 \times 24$ hours and a water vapor barrier of up to 20 $g/m^2 \times 24$ hours.

This is assured by coating the cellulose acetate film with polyvinylidene chloride (PVDC). If this coated film is used as sealing film for food containers, however, in the case of use in a Nespresso-compatible drinks capsule, this leads to blockage of the machine during the brewing operation. In order to prevent this, the pressure that acts on the film during the brewing should be reduced. However, this must not lead to such a great fall in the pressure that a satisfactory brewing outcome is no longer achieved. This is because there must also be sufficient water pressure in the sealing film in order to assure tearing of the film caused by this pressure and hence release of the beverage. The object of the invention can also be achieved, for example, with a paper (filter paper) where the porosity exceeds 1600 l/m²s for the lower paper ply.

Suitable pressure reducers for this purpose have been found to be cellulose-rich papers having a grammage of 10 to 30 g/m². The porosity of these papers varies between about 80 and 1600 l/m²s according to EN ISO 9237.

One disadvantage of the construction of the sealing film described hitherto as multilayer, for example including two-layer, under some circumstances is that when the paper and film are torn, no beverage powder, e.g. coffee powder, may escape and get into the cup. In order to prevent this, a third layer has been introduced, which likewise consists of the papers already described above and which can be applied to the side of the films that is still clear. This can prevent the problem of coffee escaping from the capsule during the brewing operation and associated blockage of the capsule machines.

In order to be able to introduce the 2- or 3-layer film into a capsule filling system, the film layers must be permanently bonded to one another. For this purpose, the three individual component films, i.e. paper-cellulose acetate film(-paper), are run together over various rolls in a laminating system and joined, i.e. bonded, to one another at 120 to 200° Celsius.

The adhesive used is the PVdC (polyvinylidene chloride) already present on the cellulose acetate film; the finished sealing film thus laminated together can then be cut to any width and dispatched and applied to the filled capsule.

As described, the function of the film is to seal a food container, for example a drinks capsule/coffee capsule or the like, and in an oxygen-tight and moisture-tight manner, in order to keep the foodstuff present therein, i.e. beverage powder, coffee powder, etc., fresh for a long period of time. This is a particular challenge especially in the case of coffee, since coffee reacts even to small amounts of oxygen with changes/degradations in taste. Since the storage time in the capsule can be one year or longer, it is not possible on production of the capsule to determine the date of use. The capsule and film must thus keep the oxygen out of the capsule interior and hence away from the beverage powder, coffee, etc. present therein, which is the case to the best possible degree with a minimum oxygen transmission rate of the film and naturally of the capsule.

Furthermore, the film is also to achieve an optimal brewing result for various foodstuffs. For example, for a caffè lungo (110 ml of coffee), it is necessary for the interplay of coffee, capsule and film to lead to a brewing time of about 40 seconds. If the value is well below that, the coffee is distinctly underextracted, and in that case tastes thin (watery) and shows only a low level of crema with little color and volume. If the value is well above that, the coffee is overextracted and tastes unpleasantly strong (Robusta-like), and the crema becomes very dark. But since there are very many different tastes, coffee varieties and preparation methods, it is not possible to meet the demand for an optimal coffee with a single film; therefore, it is an object of this invention to disclose a portfolio of multilayer films that give a satisfactory result depending on the coffee (variety, roast, grind, production time of the machine, etc.).

At the same time, according to the invention, the film is also to be compostable, which is the case with cellulose acetate and paper as described.

As set out, the at least one layer of filter paper and the water-impermeable film are bonded to one another by a lamination process.

In order to improve the sealability of this arrangement, it is also possible to scatter polymer powder between the paper ply and film in the lamination process, such that this polymer powder lies between the paper ply and the polymer film after the lamination process. The polymer powder used here preferably consists of compostable, more preferably home-compostable, material, for example $S^2PC$, PBS, PBSA, PBS/PBSA, PLA, PHA or the like.

The powder here preferably has a particle size in the range from 50 to 500 µm, more preferably 200 to 400 µm.

Where reference is made to the property of home compostability in the present application, this is understood to mean the fulfillment of the corresponding standards in this regard, namely: EN13432. Home compostability differs from industrial compostability.

The latter requires that, for composting, the material to become composted is exposed to a synthetic atmosphere in a factory, in a vessel, and hence to accomplish compostability. Home compostability, by contrast, is understood to mean composting as proceeds on a compost heap, for example in the garden.

The invention claimed is:

1. A multilayer film as packaging for at least one of food containers, drinks capsules, and coffee capsules, wherein the film consists of at least one first layer, at least one second layer, and at least one third layer, wherein
   the at least one first layer consists of porous filter paper having a thickness of about 40 to 100 µm,
   the at least one second layer consists of a gas-impermeable film, wherein the gas-impermeable film consists of cellulose acetate and/or regenerated cellulose and forms a layer coated on one and/or both sides with polyvinylidene chloride, wherein the at least one second layer has a thickness in the range between 10 µm and 30 µm and the at least one second layer follows the at least one first layer, and
   the at least one third layer consists of porous filter paper having a thickness of about 30 to 100 µm and the at least one third layer follows the at least one second layer.

2. The film as claimed in claim 1, wherein the film has a total thickness of less than 0.2 mm.

3. A coffee capsule, comprising a multilayer film according to claim 2.

4. A coffee capsule, comprising a multilayer film according to claim 1.

* * * * *